Figure 1:
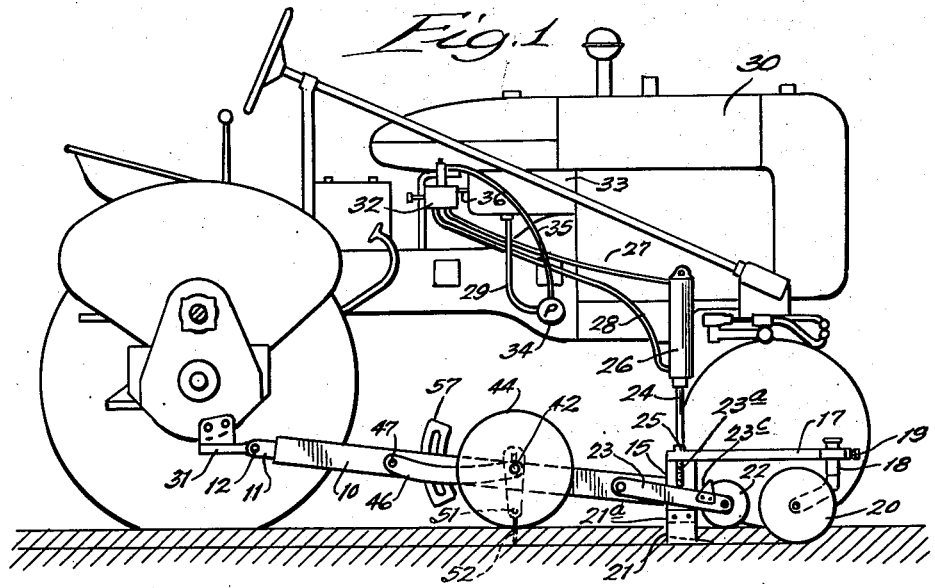

Oct. 21, 1952  A. F. HABENICHT  2,614,477
SOD CUTTER

Filed Dec. 27, 1948  2 SHEETS—SHEET 1

Inventor:
August F. Habenicht.
By Dawson, Ooms, Brothers & Spangenberg,
Attorneys.

Oct. 21, 1952 — A. F. HABENICHT — 2,614,477
SOD CUTTER
Filed Dec. 27, 1948 — 2 SHEETS—SHEET 2
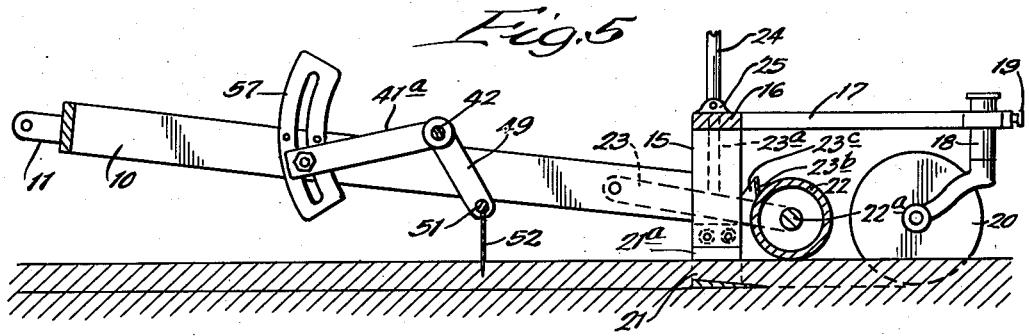
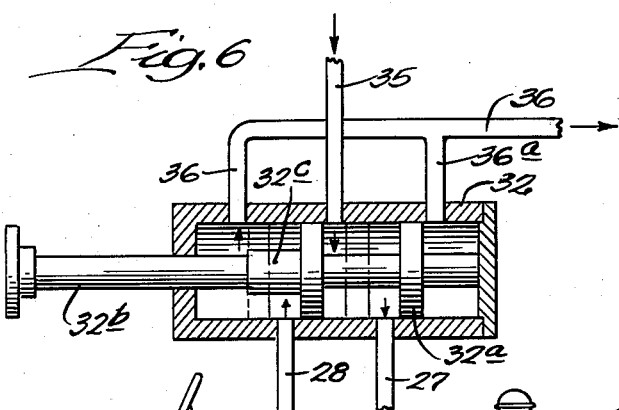
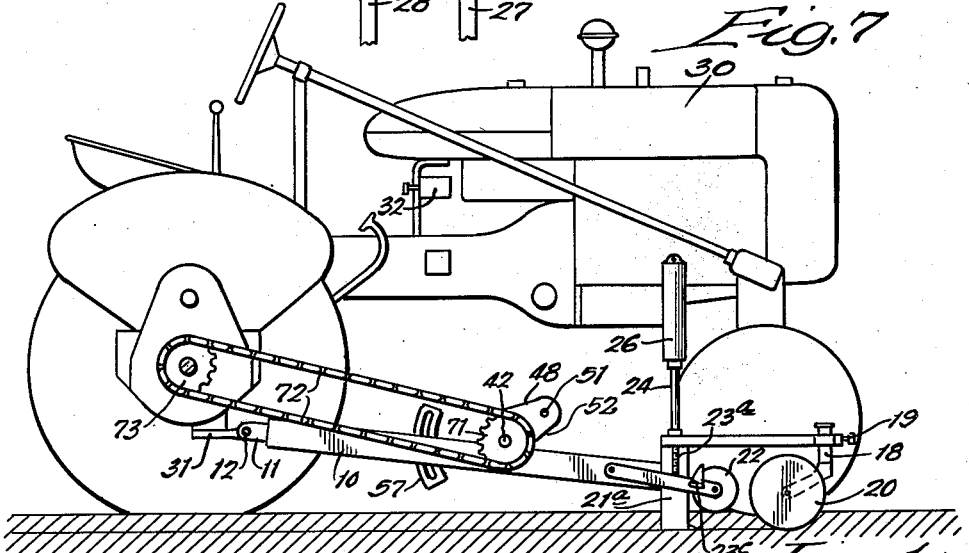
Inventor:
August F. Habenicht,
By Dawson, Ooms, Booth and Spangenberg,
Attorneys.

Patented Oct. 21, 1952

2,614,477

UNITED STATES PATENT OFFICE 2,614,477

SOD CUTTER

August F. Habenicht, Tinley Park, Ill.

Application December 27, 1948, Serial No. 67,354

6 Claims. (Cl. 97—226)

This invention relates to sod cutters; in particular, it concerns an automatic machine which, when used in conjunction with a tractor, will automatically cut sod into pieces of predetermined length and width without tearing or otherwise damaging either the cut pieces or the uncut sod remaining on the lawn.

The cultivation and sale of sod has in recent years become a very important industry. Country clubs, public institutions, and private home owners have, to an increasing extent, purchased sod for forming lawns and golf greens rather than attempting to grow grass from seed on the area to be made into lawn.

This development has taken place for two principal reasons—first, in many cases it is necessary to provide a finished lawn in a very short time, and growth of a lawn from grass seed always requires months of patient effort and care; and, second, in many situations it is possible to maintain in good condition a lawn when the initial growth of such a lawn from grass seed would have been impossible because of shade conditions or soil quality.

It has become customary in the industry to sell sod in rectangular pieces, the size of which may be in the neighborhood of three by four feet. Machines have been in existence in the past which could successfully cut a continuous strip of sod having the desired width and thickness, but no satisfactory machine has heretofore been developed which would, as it moved forward, automatically cut the sod into the desired lengths. Past efforts to produce automatic machines for that purpose have been unsuccessful for the reason that prior-art machines would not cut the sod transversely without tearing it or marring a considerable portion of sod with each transverse cut.

The customary practice in cutting sod has been, therefore, to use a machine for cutting a continuous strip of sod and to have a man follow up the machine with a measuring stick and a hand cutter to make the transverse cuts.

I have invented a simple and effective machine which can be readily attached to a tractor and with which one man can perform the complete sod-cutting operation. With my invention, one man can drive a tractor back and forth across a lawn, and the machine will automatically cut the sod into neat, cleanly-cut rectangular pieces having the desired length, width, and thickness.

It is accordingly a major object of my invention to provide an automatic machine, which, when attached to a tractor, will permit a complete sod-cutting operation by one man.

Another object of my invention is to provide an automatic machine which, while it is being moved forward in the sod-cutting operation, will cut cleanly into lengths the continuous strip of sod being cut from the lawn.

A further object of my invention is to provide a simple automatic machine which, at the operator's will, can be made to cut sod in a continuous strip or into short lengths.

Still another object of my invention is to produce, in a sod-cutting machine, a knife mechanism for making transverse cuts without tearing or damaging the sod.

Other objects and advantages of my invention will become apparent as the specification proceeds.

Figure 2:
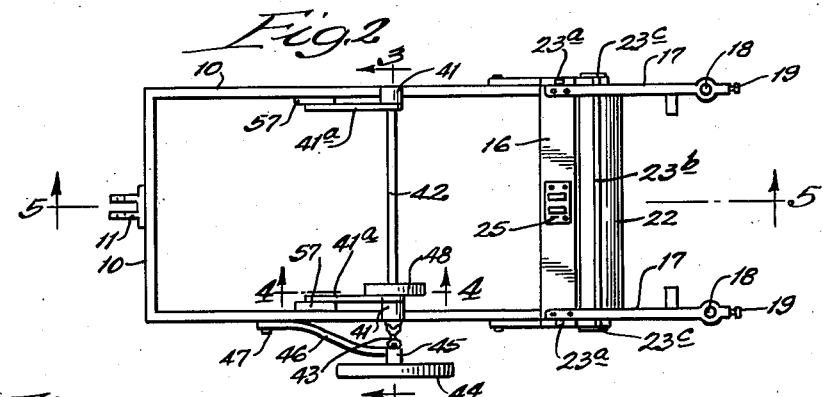
Figures 3, 4:
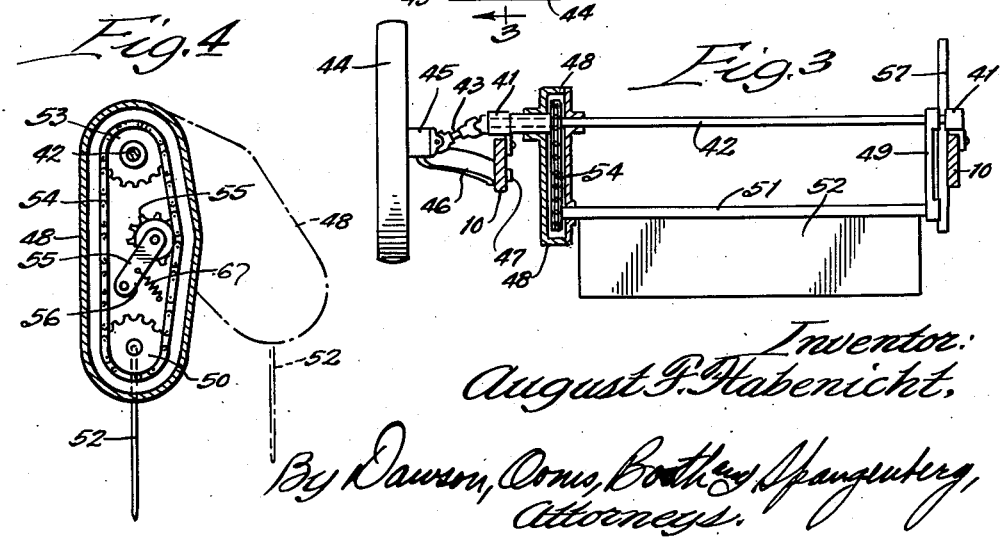

I have illustrated my invention, in two forms, in the accompanying drawings. Figure 1 is a view in side elevation of one form of my invention shown mounted on a tractor in normal position for use. Fig. 2 is a plan view of the form of the invention shown in Fig. 1. Fig. 3 is a sectional view of the Fig. 1 form of the invention, the section being taken along the line 3—3 in Fig. 2. Fig. 4 is a sectional detail view of a portion of the transverse cutting structure in the Fig. 1 form of my invention, taken along the line 4—4 of Fig. 1. Fig. 5 is a sectional view in side elevation of my invention, the section being taken along the line 5—5 in Fig. 2. Fig. 6 is a sectional view of the hydraulic control valve which may be employed for raising my sod cutter into stand-by position or for lowering it into sod-cutting position. Fig. 7 is a view in side elevation showing a modification of the Fig. 1 form of the invention wherein the apparatus for making transverse cuts is operated by power derived from the tractor axle.

As shown in the drawings, my invention is intended for use with a tractor which, in Fig. 1, is designated generally by the numeral 30. My invention is carried on a rectangular frame 10, which may be made of wood or other suitable material. The rear portion of frame 10 carries a coupling member 11 which may be affixed by means of a bolt 12 to a suitable cooperating member 31 on the rear axle structure of the tractor.

The forward ends of the sides of frame 10 are rigidly affixed respectively to a pair of vertical frame members 15, and vertical members 15 are rigidly affixed to and supported by a transverse frame member 16. Members 15 and 16 may be made of wood or other material as desired. A pair of forwardly-extending arms 17 are securely affixed respectively to the ends of transverse frame member 16; I prefer that arms 17 be formed of metal rods, although any other suitable material may be employed. Near the forward end of each of the arms 17 is an enlarged portion containing a bearing which slidably receives a swivel sleeve 18. Set screws 19 threaded into apertures in the ends of arms 17 permit sleeves 18 to be locked in position. Swiveled to each of the members 18 is a coulter 20. Coulters 20 may be formed in the usual manner; normally they will consist of relatively thin steel wheels, the rims of which have been ground to a knife edge.

Affixed to the lower ends of vertical frame members 15 is a cutting knife 21, the function of which is to advance at a desired distance, which may be one inch, below the ground level and thus cut away a strip of sod the sides of which have been defined by the vertical cuts made by coulters 20. The knife 21 has its leading edge ground to a high degree of sharpness, and its horizontally disposed blade is quite thin, so as to disturb the sod as slightly as possible as it passes over the blade. At its ends knife 21 has upwardly-turned extensions, formed of metal slightly thinner than the blades of coulters 20. These extensions, denoted 21a on the drawings, are bolted to the lower ends of frame members 15.

A roller 22 is provided to press downward on the sod in advance of the cutting edge of knife 21 to insure that a clean cut will be effected thereby; roller 22 should preferably be formed of some relatively heavy material. It is provided with an axle 22a which is journaled into a pair of supporting arms 23, pivoted to the sides of frame 10, as best shown in Figs. 1 and 5. A pair of set screws 23a are threaded into bearings provided in frame member 16 near its outer ends. They press downward on member 23 and their position controls the depth of the cut made by horizontal knife 21.

A pair of brackets 23c mounted respectively on the forward portions of arms 23 carry a scraper 23b which is positioned to bear on the surface of roller 22 as it turns for the purpose of keeping it free of sediment, since sediment on the roller 22 would cause intermittent variations in the depth of knife 21.

The forward end of the sod-cutting machine is supported by a piston rod 24, the lower end of which is pivotally secured to a coupling member 25 affixed to the upper surface of transverse frame member 16.

Piston rod 24 is coupled at its upper end to the piston within a hydraulic power cylinder 26. Power cylinder 26 is bolted to the frame of tractor 30, and the length of the piston stroke within the cylinder is such that when it is at the top of cylinder 26 the sod-cutting machine is lifted clear of the ground. When the piston is at the lower end of its stroke the frame is lowered and screws 23a press firmly against arms 23. As a result the roller 22 is forced firmly against the sod by the hydraulic pressure and knife 21 is positioned at the desired depth.

It will be understood that variations in the depth of the cut-away may be made by adjusting screws 23a, corresponding adjustments being also made in the setting of coulter swivels 18 by use of set screws 19. By thus adjusting the positions of the roller, the coulters, and knife 21, my invention may be caused to cut a strip of sod of any desired depth within wide limits, and the depth will be maintained by the force of the hydraulic piston pressing the roller 22 against the surface of the earth.

A hydraulic fluid line 27 runs from the upper end of power cylinder 26 to a port on the side of control valve 32; another hydraulic fluid line 28 runs from the lower end of power cylinder 26 to another port on valve 32.

An oil tank 33 and an oil pump 34 are shown as carried by tractor 30. These elements are normally found on tractors as a part of their standard equipment. A hydraulic line 29 runs from the tank 33 to the inlet of pump 34, and a hydraulic line 35 runs from the outlet of pump 34 to a port in the middle of control valve 32. A pair of ports near the ends of control valve 32 are joined together and connected to the oil tank 33 by a hydraulic line 36 and its branch 36a.

The operation of control valve 32 may be best understood by reference to Fig. 6. As is shown in that figure, the valve 32 contains a two-section piston 32a which is connected to and may be manually adjusted by a hand lever 32b. When valve 32 is in the position shown in Fig. 6, high pressure fluid from line 35 is fed to line 27 and thence to the upper end of power cylinder 26. This causes the piston in the power cylinder to be forced downward, so that the sod cutter is placed in the operating position shown in Fig. 1. If the manual lever 32b be pulled outward until collar 32c engages the end wall of cylinder 32, the line 27 would be vented to the oil tank through line 36, and the high pressure fluid from line 35 would be directed to the lower end of power cylinder 26 through line 28. This would result in the raising of the sod cutter to its stand-by position.

The apparatus which, in my invention, accomplishes the cutting of the sod strip into pieces of predetermined length as the machine advances is mounted on the frame members 10 a short distance to the rear of the apparatus heretofore described which accomplishes the cutting of the sod strip.

Journaled into bearings 41 is a transverse shaft 42. Bearings 41 are pivoted to frame members 10 immediately below the bearing proper, as is best shown in Fig. 3; the bearings are provided with backwardly-extending arms 41a which are bolted respectively into slotted members 57 carried by frame members 10. The slots in members 57 are arcuate in shape, and, by adjustment of the position in which arms 41a are bolted into the slots in members 57, a slight shift in the vertical plane in the relative position of shaft 42 and frame members 10 may be achieved. Shaft 42 is extended at one end slightly beyond bearing 41 and it is there connected to a flexible coupling member 43 which couples shaft 42 to the axle of a pilot wheel 44. The axle of pilot wheel 44 is rigidly affixed to the wheel itself and is journaled into a bearing 45 carried on a bracket arm 46 which extends outwardly and forwardly from frame member 10, as best shown in Figs. 2 and 3. Bracket arm 46 is pivotally mounted on frame member 10 by a bolt 47.

Pilot wheel 44 is provided with a relatively broad rim which may, if desired, have a rubber tire or other convenient means to give it substantial purchase on the ground and at the same time not cause it to cut into the ground so as to damage the turf.

Rigidly affixed to shaft 42 inside frame member 10 on the side adjacent pilot wheel 44 is a gear housing 48, the internal construction of which is most clearly shown in Fig. 4.

Rigidly affixed to shaft 42 near the end opposite the pilot wheel 44 is a depending arm 49, the position of which on shaft 42 is angularly equivalent to that of gear housing 48. A transverse shaft 51 is journaled into a bearing at the lower end of depending arm 49 and into a corresponding bearing in the inner side wall of gear housing 48. The shaft 51 carries, rigidly inserted into a longitudinal slot, a knife blade 52.

The inner end of the bearing 41 nearest pilot wheel 44 is modified to form a sprocket 53, receive within gear housing 48. A second sprocket gear 50 is rigidly affixed to the end of shaft 51 and carried also within gear housing 48 in the same vertical plane as sprocket 53. A chain 54 couples sprockets 50 and 53. An idler sprocket 55, provided to maintain tension on chain 54, is carried on an arm 56 pivotally mounted to the side of housing 48. A spring 67 is provided within housing 48 to urge idler sprocket 55 against the chain 54.

At the time of original assembly of the apparatus, sprocket 50 is positioned relative to chain 54 so that knife blade 52 occupies a vertical position, as shown in Fig. 4. The sprocket and chain enclosed within gear housing 48 thereafter operate to maintain the position of blade 52 vertical regardless of the angular position of shaft 42. This action is illustrated in Fig. 4 by the dotted portion of the drawing which shows that as housing 48 rotates with shaft 42 the depending knife 52 retains a vertical position.

A slight variation in the position of knife 52 can be accomplished by adjustment of the arms 41a within the slotted members 57, heretofore described. This rotates slightly the bearings 41 and the sprocket 53 relative to the shaft 42 and gear housing 48, thus permitting the position of knife blade 52 to be made either vertical or slightly in advance of or behind the vertical position, as may be best suited for clean cutting of the sod being worked with.

Operation of Figure 1 embodiment

In the operation of the form of my invention shown in Fig. 1, the tractor is driven, with the sod cutter raised to its stand-by position, to the point at which cutting is to commence. Thereupon the operator pushes in hand control 32b in valve 32 and thereby causes the power cylinder 26 to lower the sod-cutting machine to operating position. The driver then advances the tractor along the field of sod to be cut. The coulters 20 produce vertical cuts in the sod to the desired depth, and the horizontal knife 21, following the coulters 20, cuts away from the earth a continuous strip of sod having the desired thickness. This sod passes over blade 21 and lies on the ground like a carpet.

As the tractor advances, pilot wheel 44 turns, being in frictional contact with the ground, and shaft 42 is accordingly caused to turn. With the rotation of shaft 42 the transverse cutting knife 52 moves through a circular path, its edge being held at all times in the same angular position relative to the ground. I have learned by experiment that on most sod best results are obtained by having the transverse cutting knife 52 positioned slightly in advance of the vertical position—that is, in such position that the blade engages the ground slightly before it would do so if in a vertical position.

When the transverse cutting knife 52 drops into engagement with the sod strip, it penetrates it and cuts it cleanly, rising upward and away from the sod as the tractor moves forward. At no time does the transverse knife 52 tear or damage the sod strip, since, during the time that it is in engagement with the sod it is moving backward relative to the tractor, so that its movement relative to the sod itself is practically zero.

The result of the sod-cutting operation accomplished by my invention is a series of neatly and cleanly-cut rectangular pieces of sod, the length of each piece being determined by the distance traversed by the tractor during the time required by knife 52 to complete a revolution around shaft 42. Variation, within relatively wide limits, of the length of the pieces to be cut can be accomplished by variation in the size of pilot wheel 44. Normally sod is sold in standard lengths, and a single pilot wheel designed for such standard lengths will usually be used. Pilot wheels of different sizes, to meet other length requirements, may be held in reserve and used on the machine when necessary. Th pivotal mounting of bracket arm 46 on frame member 10 and the use of flexible coupling member 43 permits a considerable variation in the size of the pilot wheel.

A great advantage of my invention over previous sod-cutting devices, quite apart from its ability to cut the sod automatically into short lengths, is the fact that the operation of the cutting knife is at all times under the eye of the operator. Accordingly, if anything should be encountered, such as a rock or cinder, which fouls any of the cutting blades, the operator sees it at once and can immediately stop the tractor. This permits him to remove the cause of the fouling without damaging any appreciable quantity of sod. In prior-art machines carried behind a tractor, considerable sod normally would be damaged by a fouled blade before it would be observed by the operator of the tractor.

The Figure 7 embodiment

In Fig. 7 I have shown a variation of my invention in which the transverse cutter is operated by power taken from the tractor axle rather than by the pilot wheel used in the Fig. 1 embodiment. Since the Fig. 7 embodiment is identical in all other respects to the Fig. 1 embodiment, much of the detail shown in the other figures has been omitted in Fig. 7, and reference numerals have been employed which correspond to those used in the Fig. 1 embodiment, so far as applicable.

In this form of my invention, pilot wheel 44, supporting arm 46, and coupling 43 have been dispensed with. A sprocket gear 71 is mounted on the end of shaft 42, and it is coupled by a sprocket chain 72 to a sprocket wheel 73 mounted on the axle of the tractor.

The operation of this form of my invention is identical in all respects to that of the Fig. 1 embodiment except that, since the transverse cutter is operated directly by the power of the tractor, there is no possibility of any slippage such as might be encountered with the pilot wheel 44 while operating on wet turf or under other adverse conditions. In this form of the invention variation in the length of the pieces cut by the transverse cutter can be achieved by variation in the relative sizes of the sprocket wheels 73 and 71. Variation in the size of sprocket 73 would normally be inconvenient, and accordingly a change in the length of the pieces cut would normally be accomplished by replacing sprocket 71 with a sprocket of different size and adjusting the length of chain 72 accordingly.

It will be understood that any other suitable method of rotating shaft 42 may be employed.

While I have in this specification described two embodiments of my invention for purposes of illustration, it will be understood that considerable variation in matters of detail may be made by persons skilled in the art without departing from the spirit of my invention.

I claim:

1. A sod cutter adapted for mounting under a tractor, comprising in combination a frame, a pair of coulters mounted thereon, a horizontal cutting knife carried by the frame behind the coulters operative to cut the sod at a predetermined thickness, a first shaft mounted transversely on the frame, a pair of projecting arms rigidly affixed thereto, each having a bearing at its open end, a second shaft journaled in said bearings, a transversely-disposed cutting knife carried by the second shaft, means coupling the first shaft and the second shaft operative to maintain the knife on the second shaft at a substantially constant angle relative to the earth during rotation of the first shaft, and means coupling the first shaft to the tractor operative to rotate the first shaft as the sod cutter is advanced.

2. A sod cutter adapted for mounting under a tractor, comprising in combination a frame, retractable means connecting said frame to said tractor, a pair of coulters mounted thereon, a horizontal cutting knife carried by the frame behind the coulters operative to cut the sod at a predetermined thickness, a first shaft mounted transversely on the frame, a pair of projecting arms rigidly affixed thereto, each having a bearing at its open end, a second shaft journaled in said bearings, a transversely-disposed cutting knife carried by the second shaft, means coupling the first shaft and the second shaft operative to maintain the knife on the second shaft at a substantially constant angle relative to the earth during rotation of the first shaft, and means coupling the first shaft to the tractor operative to rotate the first shaft as the sod cutter is advanced.

3. A sod cutter adapted for mounting under a tractor, comprising in combination a frame, retractable means connecting said frame to said tractor, a pair of coulters mounted thereon, a horizontal cutting knife carried by the frame behind the coulters operative to cut the sod at a predetermined thickness, a first shaft mounted transversely on the frame, a pair of projecting arms rigidly affixed thereto, each having a bearing at its open end, a second shaft journaled in said bearings, a transversely-disposed cutting knife carried by the second shaft, means coupling the first shaft and the second shaft operative to maintain the knife on the second shaft at a substantially constant angle relative to the earth during rotation of the first shaft, and means for rotating the first shaft as the sod cutter is advanced.

4. A sod cutter adapted for mounting under a tractor, comprising in combination a frame, a hydraulic power cylinder adapted for mounting on the tractor and having a piston rod, means coupling the piston rod to said frame, a pair of coulters mounted thereon, a horizontal cutting knife carried by the frame behind the coulters operative to cut the sod at a predetermined thickness, a first shaft mounted transversely on the frame, a pair of projecting arms rigidly affixed thereto, each having a bearing at its open end, a second shaft journaled in said bearings, a transversely-disposed cutting knife carried by the second shaft, means coupling the first shaft and the second shaft operative to maintain the knife on the second shaft at a substantially constant angle relative to the earth during rotation of the first shaft, and means for rotating the first shaft as the sod cutter is advanced.

5. In a sod cutter having a frame, a knife apparatus for cutting the sod into sections of predetermined length comprising a rotary member, a knife rotatable about the rotary member near the periphery thereof, means for rotating the rotary member as the sod cutter advances, and mechanical linkage relating the rotary member and the rotatable knife operative to maintain the knife in a constant angular position relative to the earth while revolving through a circular arc with rotation of the rotary member, whereby said knife can penetrate the sod and be removed therefrom during advance of the sod cutter with substantially zero relative movement of said knife and the earth in the horizontal plane during any single sod-cutting operation by said knife.

6. Apparatus according to claim 5 wherein said mechanical linkage comprises a sprocket keyed in fixed angular relation relative to said knife, a second sprocket keyed in fixed angular relation to said rotary member, and a sprocket chain linking the two sprockets.

AUGUST F. HABENICHT.

REFERENCES CITED

The following references are of record in the file of this patent:

UNITED STATES PATENTS

| Number | Name | Date |
| --- | --- | --- |
| 39,048 | Hoisington | June 30, 1863 |
| 41,371 | Foley | Jan. 26, 1864 |
| 45,926 | Kirk | Jan. 17, 1865 |
| 471,231 | Bentley | Mar. 22, 1892 |
| 743,277 | Harlan | Nov. 3, 1903 |
| 764,058 | Lane | July 5, 1904 |
| 776,844 | Huddlemeyer et al. | Dec. 6, 1904 |
| 1,706,831 | Watson | Mar. 26, 1929 |
| 1,732,972 | Knipfing | Oct. 22, 1929 |
| 1,942,708 | Junor et al. | Jan. 9, 1934 |
| 2,164,246 | Kirkpatrick | June 27, 1939 |
| 2,190,347 | Austin | Feb. 13, 1940 |
| 2,250,073 | Weimer | July 22, 1941 |
| 2,330,283 | Hipple | Sept. 28, 1943 |